Jan. 6, 1931.   A. W. POPE, JR   1,787,794
INTERNAL COMBUSTION ENGINE
Original Filed Nov. 10, 1927
Fig 2
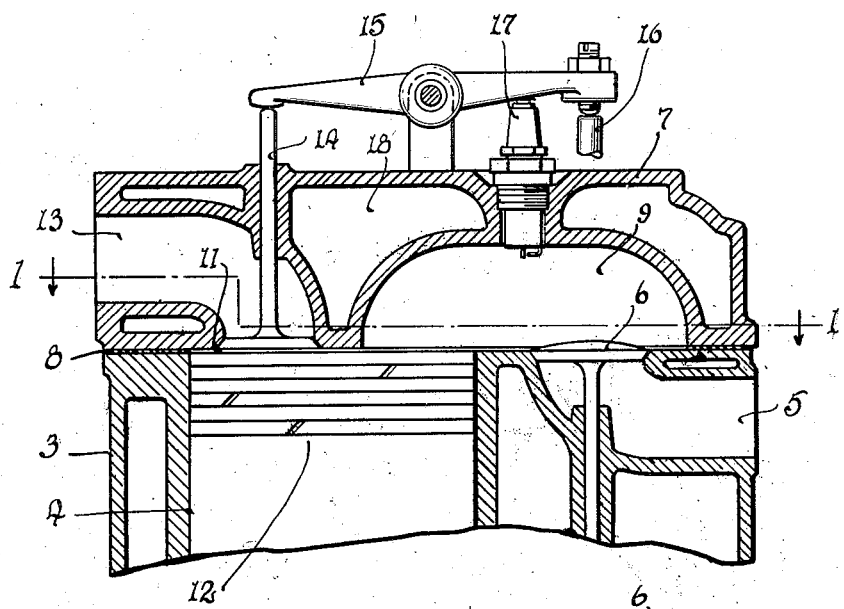
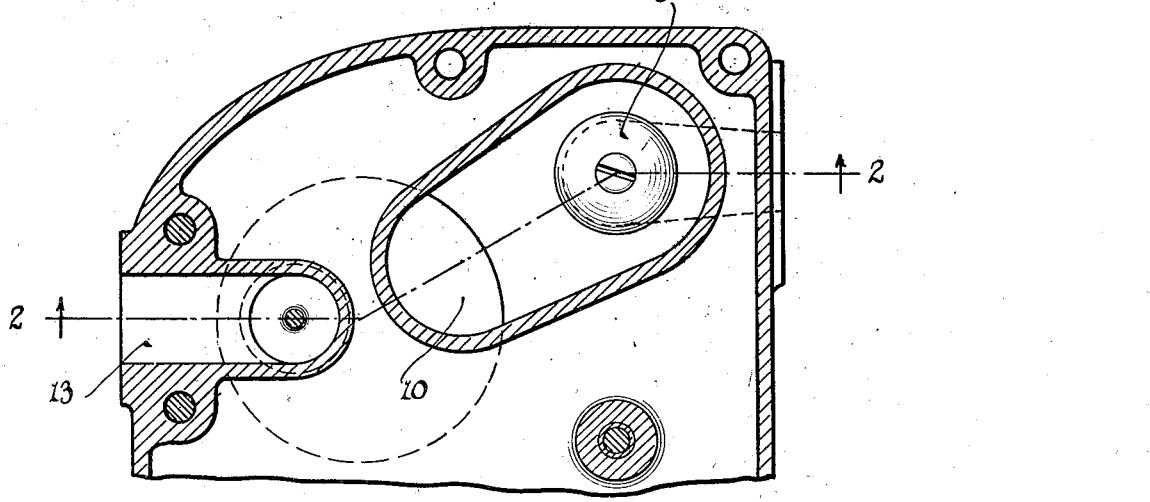
Fig 1
Inventor
Arthur W. Pope, Jr
By Brown, Boettcher & Dienner
Atty's Patented Jan. 6, 1931

1,787,794

UNITED STATES PATENT OFFICE

ARTHUR W. POPE, JR., OF WAUKESHA, WISCONSIN, ASSIGNOR TO WAUKESHA MOTOR COMPANY, OF WAUKESHA, WISCONSIN, A CORPORATION OF WISCONSIN

INTERNAL-COMBUSTION ENGINE

Application filed November 10, 1927. Serial No. 232,382. Renewed January 30, 1930.

My invention relates to internal combustion engines and particularly to their combustion chambers and the immediate appurtenances thereof, to the end of numerous advantages in construction, operation and results.

In the accompanying drawings,

Figure 1 is a horizontal sectional view of the engine of my invention taken on the plane of the line 1—1 of Figure 2; and Figure 2 is a vertical sectional view thereof taken on the plane of the line 2—2 of Figure 1.

The block 3 provides the cylinder 4, open at the top, and the intake 5 in lateral relation thereto and terminating in the top of the block as the cylinder does. The intake valve, which opens upwardly, is shown at 6.

The head 7, suitably secured upon the top of the block, with the gasket 8 intervening, is so formed as to provide a pocket 9 overlying the intake valve 6 and a portion of the cylinder, as shown. That portion of the underside of the head 7, other than the throat 10 which affords communication between the pocket 9 and the cylinder 4, lies close to the top of the cylinder as indicated at 11. The piston 12, which reciprocates in the cylinder 4, is so arranged that in its uppermost position it comes close to the portion 11 of the head, the purpose being to confine the gases substantially entirely to the pocket 9 when the piston is at the top of its stroke.

The exhaust passageway is formed in the head, as indicated at 13, being so disposed as to terminate in the portion 11 thereof, as as shown. The exhaust valve, which opens downwardly, is shown at 14, being operated by a rocker-arm 15 engaging with the end of its stem and operated, in turn, by the push rod 16 which is actuated by the cam shaft (not shown).

The spark plug is provided as shown at 17. The head, as a whole, is cored out where feasible, as indicated at 18, for the circulation of the cooling medium, the same being true of the cylinder.

By virtue of the construction described, a compact turbulence-producing combustion chamber is secured, the gases entrapped below the portion 11 of the head, when the piston is in its uppermost position, being negligible. The intake valve 6 may be made large, and given a high lift, in order to meet demands, and this without increasing engine length or interfering with complete water jacketing of its seat. Since the exhaust valve 14 is removed from the pocket 9, the combustion chamber is free of the exhaust valve hot-spot effect and its valve seat may be completely water jacketed as in the case of the intake valve as above pointed out. The above features enable the use of high compression ratios.

I claim:

1. In an internal combustion engine, a cylinder, a piston reciprocating in said cylinder, an intake passage lying alongside said cylinder, a head having a pocket forming a combustion chamber overlying said intake and part of said cylinder and having a portion lying over and close to the remainder of the cylinder area, an exhaust passage in said head terminating in said last-named portion thereof, valves for said passages, and ignition means in said pocket.

2. In an internal combustion engine, a cylinder, a piston reciprocating in said cylinder, an intake passage lying alongside said cylinder, a head having a pocket overlying said intake and part of said cylinder and having a portion lying over and close to the remainder of the cylinder area, said pocket representing all of the effective combustion space when the piston is in the position of greatest compression, an exhaust passage in said head terminating in said last-named portion thereof, valves for said passages, and ignition means in said pocket.

3. In an internal combustion engine, a cylinder, a piston reciprocating in said cylinder, a combustion chamber adjoining and communicating restrictedly with the end of said cylinder, said combustion chamber representing all of the effective combustion space when the piston is in the position of greatest compression, a combustible gas inlet passage leading directly to said combustion chamber, said combustion chamber being otherwise closed, and a burned gas outlet passage directly for said cylinder, said cylinder being otherwise closed, valves for said passages, and spark ignition means for said combustion chamber.

In witness whereof, I hereunto subscribe my name this 9th day of November, 1927.

ARTHUR W. POPE, Jr.